(12) United States Patent
Winkle et al.

(10) Patent No.: US 9,224,217 B2
(45) Date of Patent: Dec. 29, 2015

(54) ANALYTICAL CHARTING

(75) Inventors: Heather L. Winkle, Cupertino, CA (US); Toufic Milan, Ottawa (CA); Ryan Chen, Sunnyvale, CA (US); Andrew Phan, Ottawa (CA); Nikita Pisliakov, Ottawa (CA); Duc Vuong, Ontario (CA); Ashok Srinivasan, Ottawa (CA)

(73) Assignee: Apple Inc., Cupertino, CA (US)

( * ) Notice: Subject to any disclaimer, the term of this patent is extended or adjusted under 35 U.S.C. 154(b) by 855 days.

(21) Appl. No.: 13/345,568

(22) Filed: Jan. 6, 2012

(65) Prior Publication Data

US 2013/0176315 A1    Jul. 11, 2013

(51) Int. Cl.
  *G06T 11/20* (2006.01)
  *G06F 17/24* (2006.01)
  *G06F 17/30* (2006.01)
  *G06F 3/048* (2013.01)

(52) U.S. Cl.
  CPC ............ *G06T 11/20* (2013.01); *G06T 11/206* (2013.01); *G06F 3/048* (2013.01); *G06F 17/246* (2013.01); *G06F 17/30489* (2013.01); *G06F 17/30554* (2013.01)

(58) Field of Classification Search
  None
  See application file for complete search history.

(56) References Cited

U.S. PATENT DOCUMENTS

| | | | |
|---|---|---|---|
| 7,176,923 B2 | 2/2007 | Vignet | |
| 7,606,835 B2 | 10/2009 | Laaser et al. | |
| 7,880,749 B2 | 2/2011 | Favart et al. | |
| 8,024,666 B2 | 9/2011 | Thompson | |
| 8,990,717 B2 | 3/2015 | Leveille et al. | |
| 2005/0060647 A1* | 3/2005 | Doan et al. | 715/514 |
| 2006/0074879 A1* | 4/2006 | Covington et al. | 707/3 |
| 2009/0144222 A1 | 6/2009 | Modzelewski | |
| 2011/0153643 A1* | 6/2011 | Haggie | 707/769 |
| 2011/0289397 A1* | 11/2011 | Eastmond et al. | 715/212 |
| 2013/0145244 A1* | 6/2013 | Rothschiller et al. | 715/212 |

OTHER PUBLICATIONS

Author: StatPoint, Inc., Title: "Describe—Attributes and Counts", Publisher: Statgraphics Mobile—Rev. Apr. 27, 2006, Date: Apr. 27, 2006, pp. 3 http://www.statgraphics.com/Describe%20-%20Attributes%20and%20Counts.pdf.*

* cited by examiner

*Primary Examiner* — Jwalant Amin
(74) *Attorney, Agent, or Firm* — Downey Brand LLP (57) ABSTRACT

Methods, program products, and systems for analytical charting are described. A system implementing analytical charting techniques can receive a selection input from a data view displaying data retrieved from a database table. The system can determine a context of the selection input, a data environment in which the selection input is received, and characteristics of data being selected. Based on the context, the data environment, and the characteristics, the system can generate a chart data grouping that specifies a relationship between data in a chart. The system can automatically specify one or more data series for the chart based on the chart data grouping. The system can generate chart parameters automatically and transparently to the user. The system can provide the system-generated chart parameters for display and allow user modification to the system-generated chart parameters. The system can then generate a chart using the chart parameters.

30 Claims, 9 Drawing Sheets

ANALYTICAL CHARTING

TECHNICAL FIELD

This disclosure relates generally to database applications.

BACKGROUND

Many modern database tools integrate a database engine with a graphical user interface (GUI). The content of the database is formatted and displayed in the GUI according to a layout. The ability to visualize various amounts of information dynamically is an important asset for a knowledge worker who uses the database tools. Charting functions based on database content have been a significant component of various visualization tools. In a conventional database application program, a user can define a chart by designating a data source as a data series for the chart. The user can then specify one or more chart parameters. The database application program can then generate a chart using the user-specified data series and parameters.

SUMMARY

Methods, program products, and systems for analytical charting are described. A system implementing analytical charting techniques can receive a selection input from a data view displaying data retrieved from a database table. The system can determine a context of the selection input, a data environment in which the selection input is received, and characteristics of data being selected. Based on the context, the data environment, and the characteristics, the system can generate a chart data grouping that specifies a relationship between data in a chart. The system can automatically specify one or more data series for the chart based on the chart data grouping. The system can generate chart parameters automatically and transparently to the user. The system can provide the system-generated chart parameters for display and allow user modification to the system-generated chart parameters. The system can then generate a chart using the chart parameters.

Analytical charting techniques can be implemented to achieve the following advantages. The techniques can allow a user to create a chart on-the-fly. The system does not require a user to understand functions of a database application program such as switching view modes, creating or editing layouts, or creating or editing summary fields. The system can automate a chart creating process by making educated guesses on what data series or parameters a user may intend to use for a chart. The system can simplify and reduce the tasks a user needs to perform when creating a chart.

The system can determine data relationship in a chart based on data types of user-selected data. Unlike conventional charting functions (e.g., charting functions in a conventional spreadsheet application), the analytical charting techniques can automatically determine which data group is charted against which data group in a chart based on the data types of the respective data groups. For example, when a data column is selected for charting, by analyzing data in the column, the system can distinguish between a data item and a sum of multiple data items in the same data column. Accordingly, the system can automatically avoid displaying the data item and the sum side by side in a chart. Such automation can help avoid apparent data distortion in charts.

The details of one or more implementations of analytical charting are set forth in the accompanying drawings and the description below. Other features, aspects, and advantages of analytical charting will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
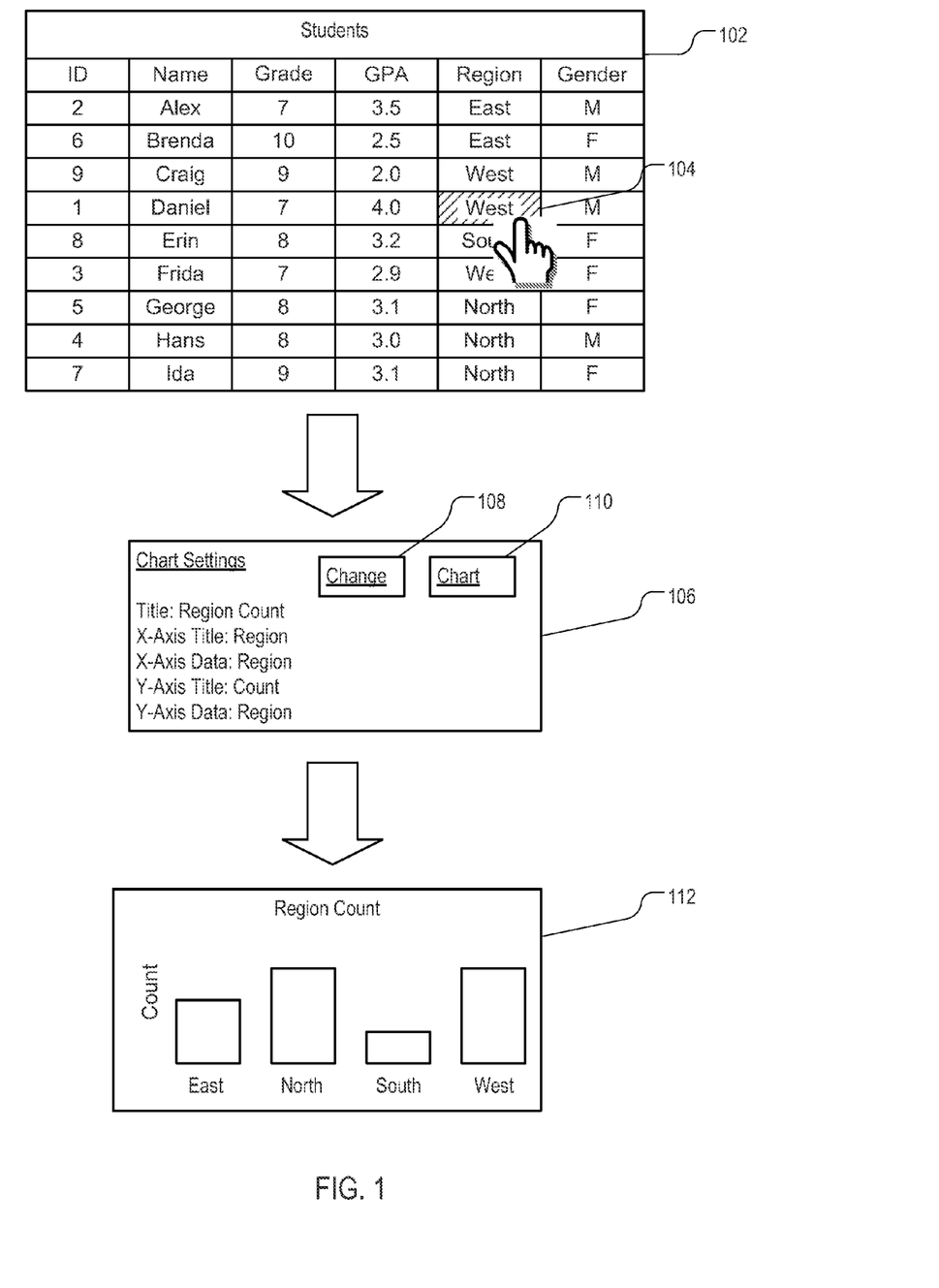
FIG. 1 is a diagram providing an overview of exemplary analytical charting techniques.

FIG. 1 is a diagram providing an overview of exemplary analytical charting techniques. In a system implementing analytical charting techniques, the system can receive a user input on displayed data. The system can perform an analysis on the user input to determine a data series in the chart that the user may wish to use and parameters the user may wish to apply to the chart. The system can create chart parameters based on the analysis, and then generate a chart using the chart parameters. For illustration, the system receives the user input in exemplary data view 102 of a "Students" data table.

Data view 102 is an exemplary user interface item of a database application. Data view 102 can be configured to display data stored in a database (e.g., a relational database, an object oriented database, a NoSQL database, or an ad hoc database). Data view 102 can have a table structure including cells organized as columns and rows. Each cell can display a data item. The columns and rows can correspond to columns and rows in one or more database tables storing the data items. Each column can have a column header (e.g., "ID," "Name," and "Grade"). Each column header can correspond to a data column name in a database table.

Each column header and each cell can include an interactive user interface element. The interactive user interface element can be configured to receive a selection input for analytical charting. For example, cell 104 can receive a click or a touch input. The click or touch input can indicate that a user wishes to create a chart that relates to the data item of cell 104.

Upon receiving the input, the system can perform an analysis to determine one or more chart parameters based on the input. The analysis can include a determination on the context of the input, for example, whether a column of cells, a row of cells, or another cell has already been selected, whether the input includes a left click or right click of a mouse, whether the input corresponds to a pre-specified touch input gesture. The analysis can include a determination of one or more characteristics of the data in cell 104, e.g., whether a data type of the data in cell 104 is a text data type, numerical data type, or repeating data type. The analysis can include a determination on an environment of the input, including, for example, whether a selected data column or unselected data column is sorted. Based on the context of the input, the characteristics of the data, and the environment, the system can determine a set of one or more chart parameters.

For example, by performing the analysis, the system can determine, based on a header of the column in which cell 104 is located, that a chart relating to "Regions" will be created. Based on a type of the data in the "Regions" column, which is a text type, the system can determine the chart will be on a count of data fields for each region. Accordingly, the system can determine that a title parameter of the chart is "Region Count." In addition, the system can determine that a preferred chart type for presenting a count is a bar chart type, which can have an X-axis and a Y-axis. Accordingly, the system can determine that an X-axis title parameter is "Region" and that an X-data series includes each region in the "Region" column in a database table. Likewise, the system can determine that a Y-axis title parameter is "Count" and that a Y-data series is a count of number of data records in each region. The system can generate the count using system-generated structured query language (SQL) query "COUNT (ID) GROUP BY (Region)." The system can determine that the Y-data series is charted against the X-data series such that the chart has a "count" by "region" data grouping.

The system can provide the chart parameter determined by the analysis for display and modification in chart setup dialog 106. Chart setup dialog 106 can be an exemplary graphic user interface item that appears to the user to be generated in response to the input. Chart setup dialog 106 can include interactive elements, for example, change button 108 and chart button 110. Change button 108 can receive a user input (e.g., a click or a touch) for changing the system-determined charting parameters. Chart button 110 can receive a user input for generating a chart using the current chart parameters. Further details of chart setup dialog 106 will be described below in reference to FIG. 5.

Upon receiving a user input through chart button 110, the system can generate chart 112 for display. Chart 112 can be generated based on the system-determined parameters. By using the analytical charting techniques, the system can generating chart 112 without requiring a user to specify parameters such as a chart type, a chart name, or a chart data series. These parameters are generated automatically and transparently.

Figure 2:
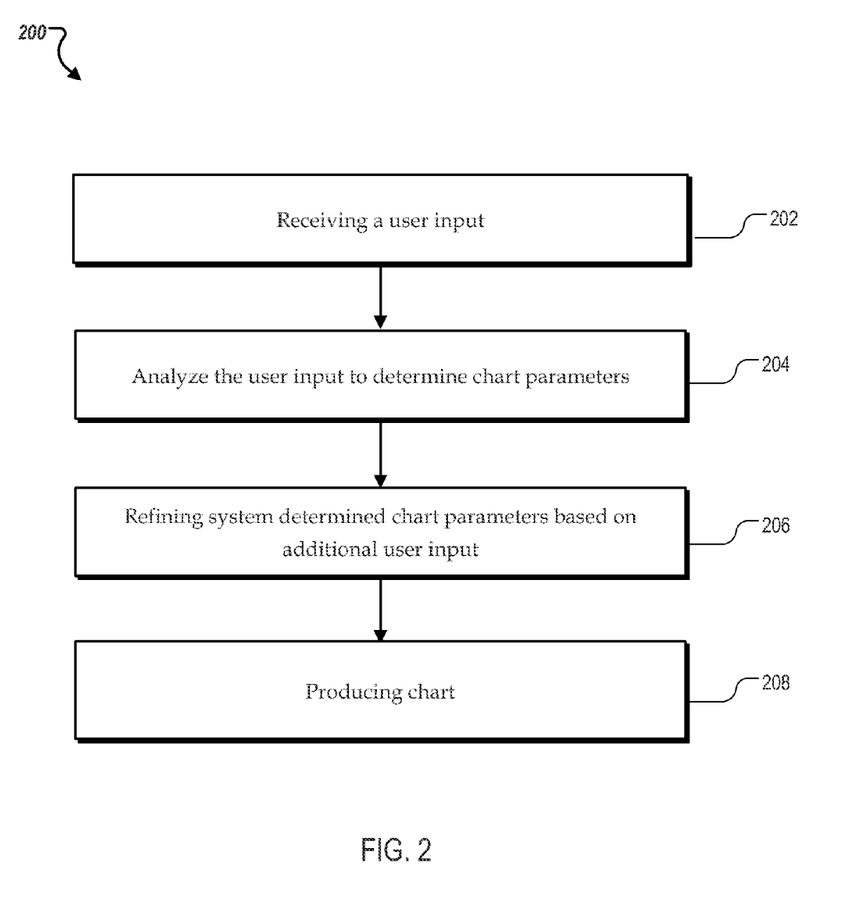
FIG. 2 is a flowchart illustrating an exemplary process of analytical charting.

FIG. 2 is a flowchart illustrating exemplary process 200 of analytical charting. A system can receive (202) a user input through a data view. The user input can include a selection of one or more data items. The data view can include a displayed view of a table, a form, or a list of data items. The system can analyze (204) the user input, including a context of the input, a characteristic of a data item (data field or data column) selected by the input, and a data environment of the input. Based on the analysis, the system can determine one or more chart parameters. The operations of analyzing the user input will be described in further details below in reference to FIG. 3. Optionally, the system can refine (206) the system-determined chart parameters based on additional user input through a user interface (e.g., chart setup dialog 106 of FIG. 1). The user interface can be a graphical user interface populated with the system-determined chart parameters. The system can then produce (208) a chart based on the chart parameters. Producing the chart can include printing, displaying, or saving the chart. Saving the chart can include saving the chart parameters as one or more layout objects.

Exemplary Procedures of Determining Chart Parameters

Figure 3:
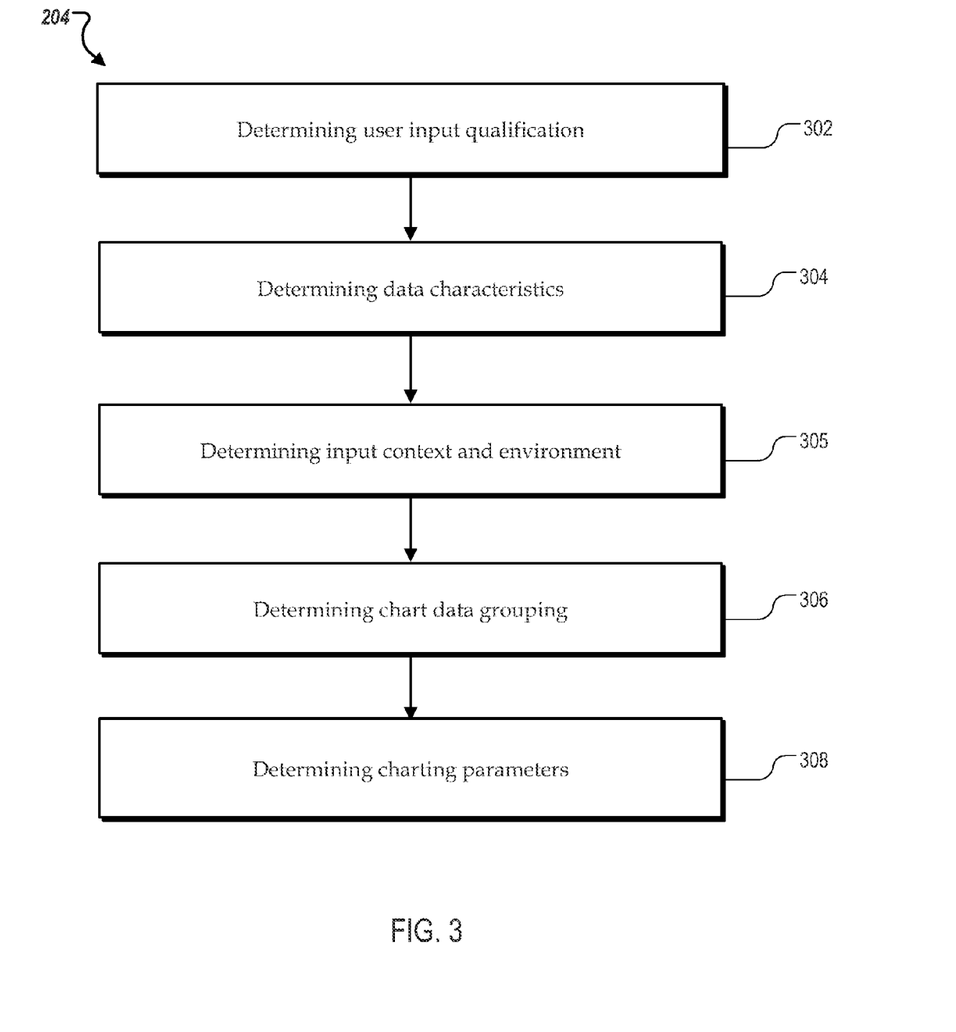
FIG. 3 is a flowchart illustrating exemplary operations of analyzing user input to determine a chart data grouping.

FIG. 3 is a flowchart illustrating exemplary operations of analyzing (204) user input to determine chart parameters. A system implementing analytical charting techniques can determine (302) a user input qualification. A user input can trigger analytical charting operations when the input satisfies one or more specified criteria. The criteria can include whether the input is received at a pre-specified access point and in a pre-specified input zone. If the system receives a pre-specified input in the pre-specified access point and in the pre-specified click zone, the system can determine that further operations of analysis will be performed. The system can use example Table 1 below to make the determination.

TABLE 1

| Access Point | Input Zone | Input Type |
|---|---|---|
| Table | Data field | Right-click/Double tap |
| Table | Column header | Right-click/Double tap |
| Table | Column header | Arrow menu on header/ Incoming gesture |
| List | Data field | Right-click/Double tap |
| Form | Data field | Right-click/Double tap |

The "access point" in Table 1 indicates a type of data view through which the user input is received. The "input zone" (e.g., a column header or a data field that corresponds to a cell) indicates a location on the display where the input is received. The "input type" indicates exemplary types of user action that, if received, the system can proceed to determine data characteristics.

The system can determine (304) data characteristics. Determining data characteristics can include determining a data type of the input zone and a data pattern of content of the input zone. Determining the data type can include determining that the data of the input zone has a text type, a number type, or a summary type. Determining the data pattern can include determining whether the content in a selected column or in a column where a selected data field is located is repeating content or nonrepeating content. Based on the data characteristics, the system can provide an estimate on the type of operations the system will take in chart generation. The system can use exemplary Table 2 below to estimate the type of operations based on the data characteristic.

TABLE 2

| Data Type | Repeating | Action |
|---|---|---|
| Text (T) | No | Count |
| Text | Yes | Count |
| Number (N) | No | Plot, Math operations |
| Number | Yes | Plot, Count, or Math operations |
| Summary Field (S) | No | Plot, Count, or Math operations |
| Summary Field | Yes | Plot, Count, or Math operations |

The system can determine numeric values for drawing a chart's data points based on an action. When the action is "plot," the system can draw X and Y coordinates corresponding to currently specified or inferred set of data entries. For example, if the data set includes hours students spent studying for a test and the numeric grade received, the system can plot (10, 99), (5, 80), (8, 92) on the chart. When the action is "math," the system can perform calculation including, for example, total, average, minimum, maximum, standard deviation of, or fraction of total, and use the resulting numbers to draw the chart. For example, if the data set includes student grades for fall, winter, and spring semesters, the system can find the average student grade for each semester.

In some implementations, the system can treat a non-numerical data type (e.g., date, time, timestamp, or calculation field types) as number data types, if the non-numerical data type can be converted to a number value through coercion (a type cast). In these implementations, the system can apply summary functions to data having the non-numerical data type. The system can exclude multi-media data (e.g., data having a "container" data type) from the analysis.

The "repeating" column of Table 2 indicates whether the selected data is repeating or non-repeating. The system can determine whether the selected data are repeating or nonrepeating based on results from an inspection of the selected data. The inspect operations will be described in further detail below. The "action" column of Table 2 indicates types of operations the system can perform based on the data type and whether the data is repeating.

Determining whether a data field is a repeating field can increase the accuracy of matching between the system's analysis and a user's intent on what data are to be charted against what data. To determine whether a data field is a repeating field, the system can perform a scan of the content of the selected data column or the data column where a selected data field is located. In some implementations, the system can scan the entire database for all rows corresponding to the data column, when the number of rows in the database does not satisfy a threshold. When the number of rows satisfies the threshold, the system can determine whether a data field is repeating using a dual-threshold sampling procedure.

In the dual-threshold sampling procedure, the system can receive a pre-specified sample size threshold and a pre-specified watermark threshold. The sample size threshold can be a value (e.g., 500) that, if a database table has the sample size threshold or fewer rows of records, the system samples each row. Otherwise, the system can select the sample size threshold number of rows as samples. The system can perform the selection using operations configured to avoid statistical bias. The selection can be nondeterministic, where a sample selected at a first time is different from a sample selected at a second time. In some implementations, the system performs random selection of samples. Random selection can improve the accuracy of results of the sampling procedure.

The system can then scan the sampled rows to determine whether content corresponding to a selected data column or a data column containing a selected data field has a repeating pattern. The system can make the determination using a watermark threshold. The system can determine a repeating target based on a sample size (less than or equal to the threshold times sample size) and the watermark threshold. The repeating target can be a function of the sample size and the watermark threshold. For example, the system can determine the repeating target T using the following equation.

$$T = Tw * N, \quad (1)$$

where Tw is the watermark threshold, and N is the sample size. For example, if Tw=0.3 and N=500, the repeating target can be 150 (rows of data records). If there are at least T rows of data records in the sample that have distinct values, the system can determine that the column being sampled is non-repeating. Otherwise, the system can determine that the column is repeating.

In some implementations, the system can apply a performance threshold to the dual-threshold sampling procedure. The performance threshold can be a temporal value (e.g., 1 second) that limits an amount of time the system uses in performing the dual-threshold sampling procedure. The performance threshold can be used to prevent a user from waiting too long for the evaluation to complete. After reaching the performance threshold, the system can stop further evaluation. The system can include only those already evaluated records in the sample data.

The system can determine (305) an input context and a data environment of the input. Determining the input context can include determining, when more than one of a data column or data field is selected, an order of the selection. The system can determine whether, when a last selection is made, whether a column has already been selected. The data environment can include a sorting condition of data columns selected prior to the user action on a data field in a cell. Determining the data environment of the input can include, for example, determining whether a data view from which the input is receive is sorted. Determining whether the data view is sorted can include (1) determining whether the data view is sorted by a selected data column or data column where a selected data field is located, or (2) determining whether the data view is sorted by a data column not selected by a user and does not include a selected data field, or both (1) and (2). The system can determine that the data view is sorted by a column currently displayed or a column currently off screen.

The system can determine (306) a chart data grouping based on the input context and the data environment. A chart data grouping can include a chart setting that specifies a first data group (e.g., a data series) and a second data group (e.g., another data series), where the first data group is charted against the second data group. For example, the first data group can be a series of numbers. The second data group can be a series of dates. The chart data grouping can specify that, in a chart, the numbers be charted against the dates. A chart data grouping can be expressed as "Chart <A> by <B>" where data group <A> is charted against data group <B>. In some chart data groupings, one of data group <A> or data group <B> can be omitted, indicating that data in a data group organized in a first manner (e.g., as a count, in the form of "COUNT(DISTINCT Region)") are charted against data in the same group organized in a second manner (e.g., as individual values, in the form of "Region"). These chart data groupings can be expressed as "Chart <A>" or "Chart by <B>," respectively.

Determining the chart data grouping based on the input context and the data environment can occur before, during, or after determining the data type. The system can offer chart options based on at least one of: (1) whether a current data view is sorted, (2) whether any columns have been selected before a selection of a data field, or (3) whether a selected data field is in a cell in the sorted or selected column (an "action cell") or a cell in a column other than the sorted or selected column (a "non-action cell"). The selection of the data field can be a mouse click (e.g., a right click) or a touch input on the cell. The system can determine a chart data grouping according to exemplary Table 3 below.

TABLE 3

| Environment and Context | Action Cell | Non-Action Cell |
|---|---|---|
| Data view not sorted and no column selected | | Chart by <field_name> |

TABLE 3-continued

| Environment and Context | Action Cell | Non-Action Cell |
|---|---|---|
| Data view sorted and no column selected | Chart by <field_name> | Chart < field_name > by <outermost_sort_field_name> |
| Data view not sorted and one or more columns selected in a table view | Chart <name_of_selected_column1>, <name_of_selected_column2>, . . . by < field_name >; or Chart < field_name >, <name_of_selected_column1>, <name_of_selected_column2>, . . . by <name_of_one_selected_field>; Or Chart by <name_of_field>, <name_of_selected_column1>, <name_of_selected_column2>, . . . | |
| Data view sorted and one or more columns selected in a table view | Chart < field_name >, <name_of_selected_column1>, <name_of_selected_column2>, . . . by <outermost_sort_field_name> | |

The data view can include at least a portion of a table, form, or list as displayed. Sorting can be hierarchical. For example, data can be sorted by column A, then column B, then column C. An outermost sort_field_name can be a name (or another identifier) a data field or column that is located at the top of the hierarchy (e.g., column A in the example above). The "action cell" column can indicate exemplary system-determined chart data groupings when a selection input (e.g., a right click or a touch input) is received in an action cell. The "non-action cell" column can indicate exemplary system-determined chart data groupings when a selection input is received in a non-action cell. Each chart data grouping (e.g., "Chart <field_name> by <outermost_sort_field_name>") can correspond to a distinct procedure for determining chart parameters. A field_name can be a name (or another identifier) of the data field receiving the selection. In some implementations, the field_name can be a column header of a data column where the data field is located.

The system can then determine (308) chart parameters based on the data type and chart data grouping. The system can apply different procedures for different chart data grouping and data type permutations. Determining the chart parameters can include performing example procedures 308A, 308B, or 308C according to the permutations. Example procedures 308A, 308B, and 308C are described below in further detail in reference to FIGS. 4A-4C.

Figure 4A:
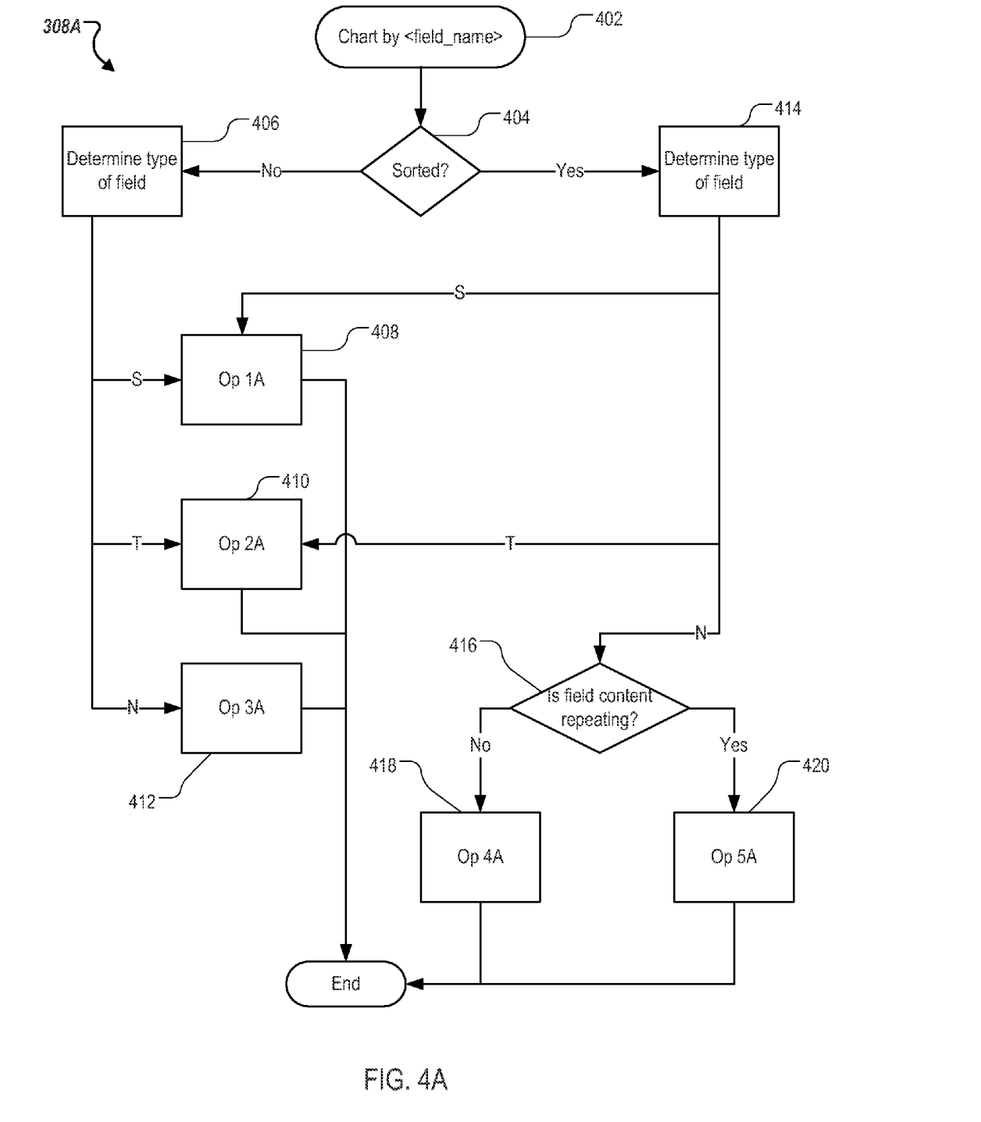
FIGS. 4A-4C are flowcharts illustrating exemplary procedures for determining chart parameters.
Figure 4B:
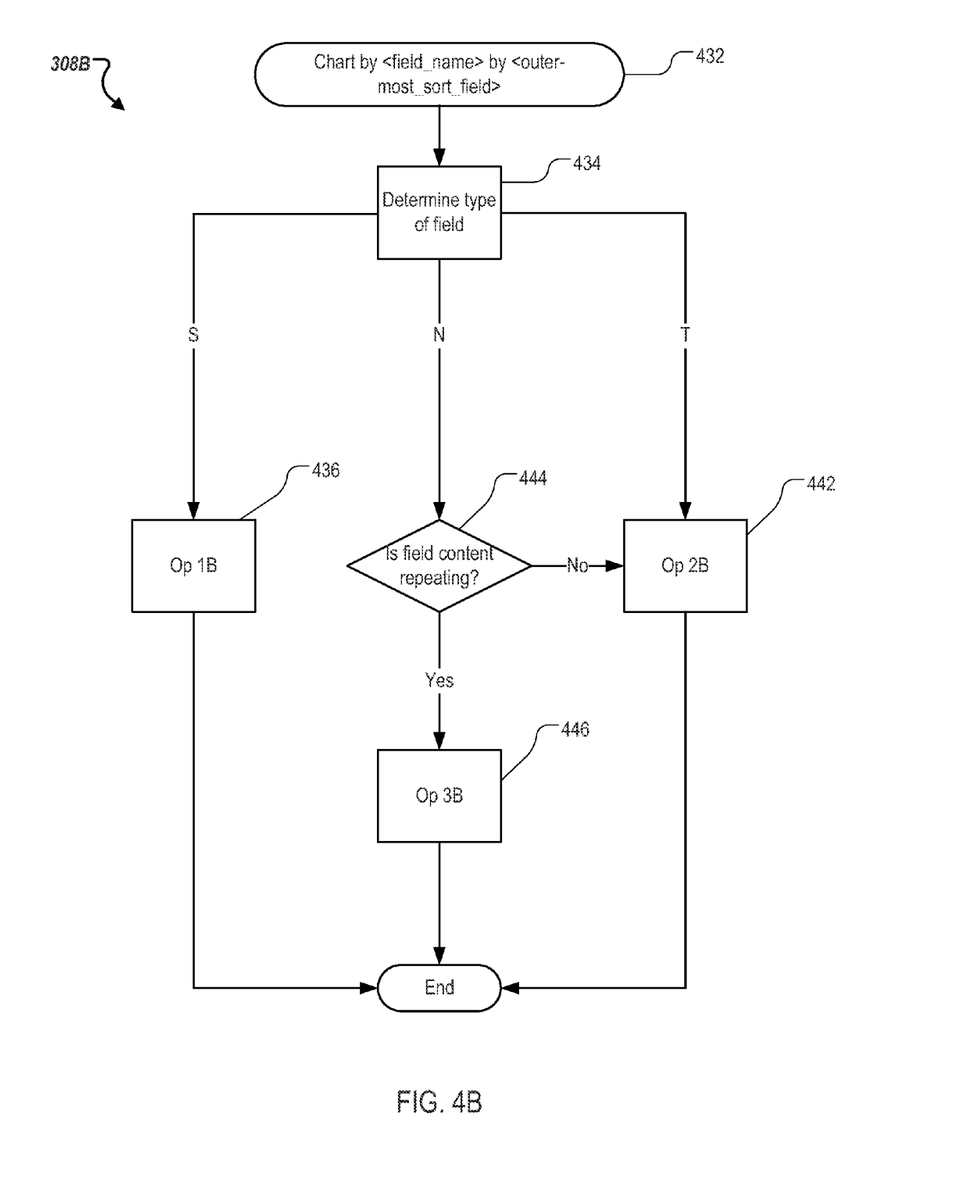
Figure 4C:
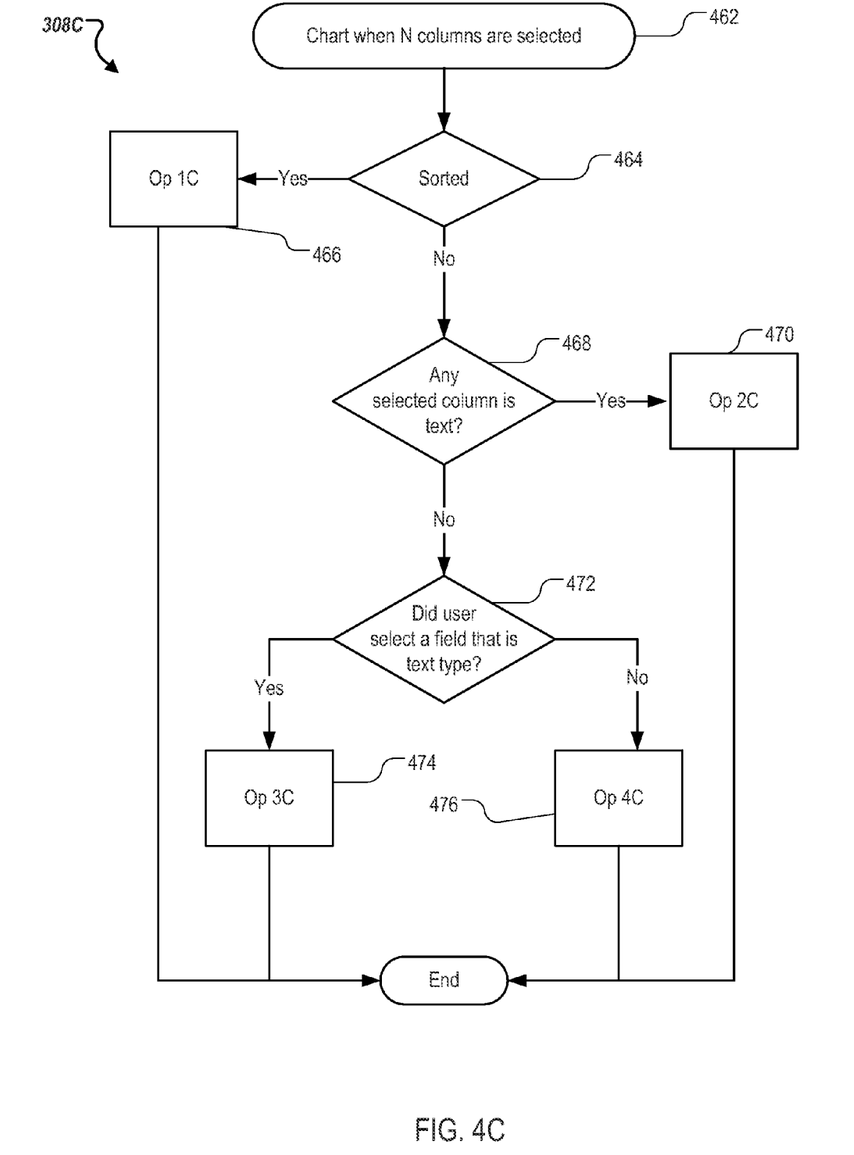

FIGS. 4A-4C are flowcharts illustrating exemplary procedures for determining chart parameters. FIG. 4A is a flowchart illustrating exemplary procedure 308A for determining charting parameters when the chart data grouping is charted by field name. The system starts procedure 308A from stage 402, upon determining that the chart data grouping is charted by field name.

The system can determine (404) whether a data view is sorted. Upon determining that the data view is not sorted, the system can determine (406) a data type of a data field from which an input is selected. If the system determines that the data type is a summary type, the system can perform (408) a procedure, which, for convenience, will be referred to as "Op1A." The data field can have a summary type when the field contains a result of a summary calculation (e.g., sum, average, maximum of, minimum of, or deviation) of values across a group.

In procedure Op1A, the system can specify the following exemplary chart parameters. The system can set a chart title to a name of the field (e.g., field_name). The system can designate a title of a Y-axis of the chart to be the name of the field. The system can designate a name of a first Y-data series to be the name of the field. (A chart can have multiple Y-data series, the first of which being system-determined.) The system can designate data of the first Y-data series to be the data in the field associated with the name. The system can designate a summary type of the data field as a temporary summary type of the first Y-data series. The temporary summary type can be a system-determined summary type that can be further changed by a user after a chart is finalized. Additional details on applications of data having a temporary summary type will be described below in reference to FIG. 5.

If, in stage 406, the system determines that the data type is a text type, the system can perform (410) a procedure, which, will be referred to as "Op2A." In procedure Op2A, the system can specify the following exemplary chart parameters. The system can set a chart title to a name of the field (e.g., field_name) concatenated with a constant or variable string (e.g., "Count") such that the chart title reads, for example, "<field_name> Count." The system can designate a title of a Y-axis of the chart to be the name of the field concatenated with the constant or variable string. The system can designate a name of a first Y-data series to be the name of the field concatenated with the constant or variable string. The system can designate data of the first Y-data series to be the data in the field associated with the name.

In procedure Op2A, the system can designate a temporary summary type of the first Y-data series to be a "count" if the selected field is not a target field of a summary field defined in a leading or trailing summary part. A leading or trailing summary part can be a data field for summary data for a group of data items that is placed before or after the group of data items. If the field being charted is a target field of a summary field defined in a leading or trailing summary part, the system can perform operations that, for convenience, will be referred to as summary part operations. In summary part operations, the system can coerce the summary function into another summary function. The system can perform the coercion operations when two summary fields have a same summary type but different settings on that summary type, e.g., a "total" and a "running total." The system can coerce from a complex summary function to a simple summary function.

If the field being charted is a target field of a summary field defined in a leading or trailing summary part, the system can designate the same summary type as the type of that summary field. The field being charted can be a target field of a certain type, e.g., Type A, of summary field in a leading summary part; meanwhile, the field can also be a target field of another summary field, e.g., of Type B, in a trailing part. The system can choose a matching summary field according to a pre-specified order. For example, the order can be: (1) leading grand part, (2) trailing grand part, (3) leading subtotal part, and (4) trailing subtotal part. In the case presented before, the system can choose Type A.

If, in stage 406, the system determines that the data type is a number type, the system can perform (412) a procedure, which, for convenience, will be referred to as "Op3A." In procedure Op3A, the system can specify the following exemplary chart parameters. The system can set a chart title to a name of the field (e.g., field_name). The system can designate a title of a Y-axis of the chart to be the name of the field. The system can designate a name of a first Y-data series to be the name of the field. The system can designate data of the first Y-data series to be the data in the field associated with the name. The system can designate a temporary summary type of the first Y-data series to be nil.

If, in stage 404, the system determines that the table view is sorted, the system can determine (414) a data type of a selected data field. If the system determines that the data type is a summary type, the system can perform (408) procedure Op1A as described above. If the system determines that the data type is a text type, the system can perform (410) procedure Op2A as described above.

If the system determines that the data type is a number type, the system can determine (416) if the field content is repeating. If the system determines that the field content is non-repeating, the system can perform (418) a procedure, which, for convenience, will be referred to as "Op4A."

In procedure Op4A, the system can specify the following exemplary chart parameters. The system can set a chart title to a name of the field (e.g., field_name). The system can designate a title of a Y-axis of the chart to be the name of the field. The system can designate a name of a first Y-data series to be the name of the field. The system can designate data of the first Y-data series to be the data in the field associated with the name. The system can designate a temporary summary type of the first Y-data series to be nil. The system can specify that when data are sorted, individual data records will be provided for display as data points.

If, in stage 416, the system determines that the field content is repeating, the system can perform (420) a procedure, which, for convenience, will be referred to as procedure "Op5A." In procedure Op5A, the system can specify the following exemplary chart parameters. The system can set a chart title to a name of the field (e.g., field_name). The system can designate a title of a Y-axis of the chart to be the name of the field. The system can designate a name of a first Y-data series to be the name of the field. The system can designate data of the first Y-data series to be the data in the field associated with the name.

In procedure Op5A, the system can designate a temporary summary type of the first Y-data series to be a "count" summary type if the field being charted is not a target field of a summary field defined in a leading or trailing summary part. If the field being charted is a target field of a summary field defined in a leading or trailing summary part, the system can perform the summary part operations as described above.

FIG. 4B is a flowchart illustrating exemplary procedure 308B for determining charting procedures when the chart data grouping is chart field name and by outermost sort field. The system starts procedure 308B from stage 432, upon determining that the chart data grouping is chart field name by outermost sort field.

The system can determine (434) a data type of a data field from which an input is selected. If the system determines that the data type is a summary type, the system can perform (436) a procedure, which, for convenience, will be referred to as "Op1B."

In procedure Op1B, the system can specify the following exemplary chart parameters. The system can set a chart title to a name of the field (e.g., field_). The system can specify that a title of an X-axis is a name of the outermost sort field. The system can specify that data series of the X-axis are the data in the outermost sort field.

In procedure Op1B, the system can designate a title of a Y-axis of the chart to be the name of the field. The system can designate a name of a first Y-data series to be the name of the field. The system can designate data of the first Y-data series to be the data in the field associated with the name. The system can designate a temporary summary type of the first Y-data series to be a summary type of the field.

If, in stage 434, the system determines that the data type is a text type, the system can perform (442) a procedure. For convenience, this procedure will be referred to as "Op2B."

In procedure Op2B, the system can specify the following exemplary chart parameters. In procedure Op2B, the system can set a chart title to a name of the field (e.g., field_name) concatenated with at least one of a constant or variable string (e.g., "Total by" and <outermost_sort_field_name>) such that the chart title is, for example, "<field_> Total by <outermost_sort_field_name>." The system can specify that a title of an X-axis is a name of the outermost sort field. The system can specify that data series of the X-axis are the data in the outermost sort field.

In procedure Op2B, the system can designate a title of a Y-axis of the chart to be the name of the field concatenated with the constant or variable string (e.g., "<field_name> Total"). The system can designate a name of a first Y-data series to be the name of the field concatenated with the constant or variable string (e.g., "<field_name> Total"). The system can designate data of the first Y-data series to be the data in the field associated with the name.

In procedure Op2B, the system can designate a temporary summary type of the first Y-data series to be a "total" if the field being charted is not a target field of a summary field defined in a leading or trailing summary part. If the field being charted is a target field of a summary field defined in a leading or trailing summary part, the system can perform the summary part operations as described above.

If, in stage 434, the system determines that the data type is a number type, the system can determine (444) if content in the field being charted is repeating content. If the content is not repeating content, the system can perform (442) procedure Op2B as described above. If the content is repeating content, the system can perform (446) a procedure, which, for convenience, will be referred to as "Op3B."

In procedure Op3B, the system can specify the following exemplary chart parameters. In procedure Op2B, the system can set a chart title to a name of the field (e.g., field_name) concatenated with at least one of a constant or variable string (e.g., "Count by" and <outermost_sort_field_name>) such that the chart title is, for example, "<field_name> Count by <outermost_sort_field_name>." The system can specify that a title of an X-axis is a name of the outermost sort field. The system can specify that data series of the X-axis are the data in the outermost sort field.

In procedure Op3B, the system can designate a title of a Y-axis of the chart to be the name of the field concatenated with the constant or variable string (e.g., "<field_name> Count"). The system can designate a name of a first Y-data series to be the name of the field concatenated with the constant or variable string (e.g., "<field_name> Count"). The system can designate data of the first Y-data series to be the data in the field having the name.

In procedure Op2B, the system can designate a temporary summary type of the first Y-data series to be a "count" if the field being charted is not a target field of a summary field defined in a leading or trailing summary part. If the field being charted is a target field of a summary field defined in a leading or trailing summary part, the system can perform the summary part operations as described above.

FIG. 4C is a flowchart illustrating exemplary procedure 308C for determining chart parameters when the chart data grouping is one of the chart data groupings to be applied where one or more columns of a table view are selected (see Table 3 above). In a table view, a user can select multiple columns. When a number of columns have been selected, a user can select a next column by selecting (e.g., right clicking or touching) a data field in the next column or a header of the next column. Each of the selected columns can have a summary type, text type, or number type.

The system can include the select columns in the analysis and identify a column that is estimated to be the most likely to be used as an X-data series. The system can start procedure 308C from stage 462, upon determining that one or more columns have been selected.

The system can determine (464) whether a data view is sorted. Upon determining that the data view is sorted, the system can perform (466) a procedure, which, for convenience, will be referred to as "Op1C."

In procedure Op1C, the system can designate an outermost sorted field as an X-axis. The system can designate other selected columns, including a column a right click (or touch) occurs, each as a Y-data series. Procedure Op1C can correspond to chart data grouping of Chart <name_of_field>, <name_of_selected_column1>, <name_of_selected_column2>, . . . by <outer_most_sort_field>.

If, in stage 464, the system determines that the data view is not sorted, the system can determine (468) whether at least one of the selected columns, except the column where the right click occurs, has a text type. If a selected column has a text type, the system can perform (470) a procedure, which, for convenience, will be referred to as "Op2C."

In procedure Op2C, the system can select, from one or more selected columns, a column (e.g., a first column according to a selection order) that has a text type. The system can designate the selected column as an X-axis. The system can designate each of the other selected columns, including a column where the right click occurred, as a Y-data series. Procedure Op2C can correspond to a chart data grouping of Chart by <name_of_field>, <name_of_selected_column1>, <name_of_selected_column2>, . . . by <name_of_one_selected_field>. The name of the one selected field can be a name (or another identifier) of the column that has the text type.

If the system determines, at stage 468, that none of the selected columns has a text type, the system can determine (472) whether a user selected (e.g., by a right click or a touch input) a data field that has a text type. If the system determines that a user selected a data field that has a text type, the system can perform (474) a procedure, which, for convenience, will be referred to as procedure "Op3C."

In procedure Op3C, the system can designate a data column where the selection input occurred as an X-axis. The system can designate each of the other selected columns as a Y-data series. Procedure Op3C can correspond to a chart data grouping of Chart <name_of_selected_column1>, <name_of_selected_column2>, . . . by <field_name>.

If the system determines, at stage 472, that a user did not right-click or otherwise select a data field that has a text type, the system can perform (476) a procedure, which, for convenience, will be referred to as procedure "Op4C."

In procedure Op4C, the system can designated each of the column where the selection input occurred and other selected columns as Y-data series. Procedure Op4C can correspond to chart data grouping of Chart <name_of_field>, <name_of_selected_column1>, <name_of_selected_column2>, . . . .

For each of procedures 308A, 308B, and 308C, the system can perform additional operations when data having a temporal type (e.g., date type, time type, or timestamp type) are selected for charting. If a data field designated as an X-axis data series has a temporal type, the system can provide temporal data format (e.g., "Date," "Time," or "Timestamp") as options to format data represented on X-axis. If a data field designated as a first Y-axis data series has a temporal type, the system can provide a temporal data format (e.g., "Date," "Time," or "Timestamp") as an option to format data represented on Y-axis.

For each of procedures 308A, 308B, and 308C, the system can perform additional operations when data having a text type (e.g., string or variable-length string) are selected for charting. The additional operations can include truncating a string according to one or more string truncation rules. The string truncation rules can include, for example, rules on a length of a truncated string, and rules on where (beginning, middle, or end of a string) a string is truncated.

Exemplary User Interface

Figure 5:
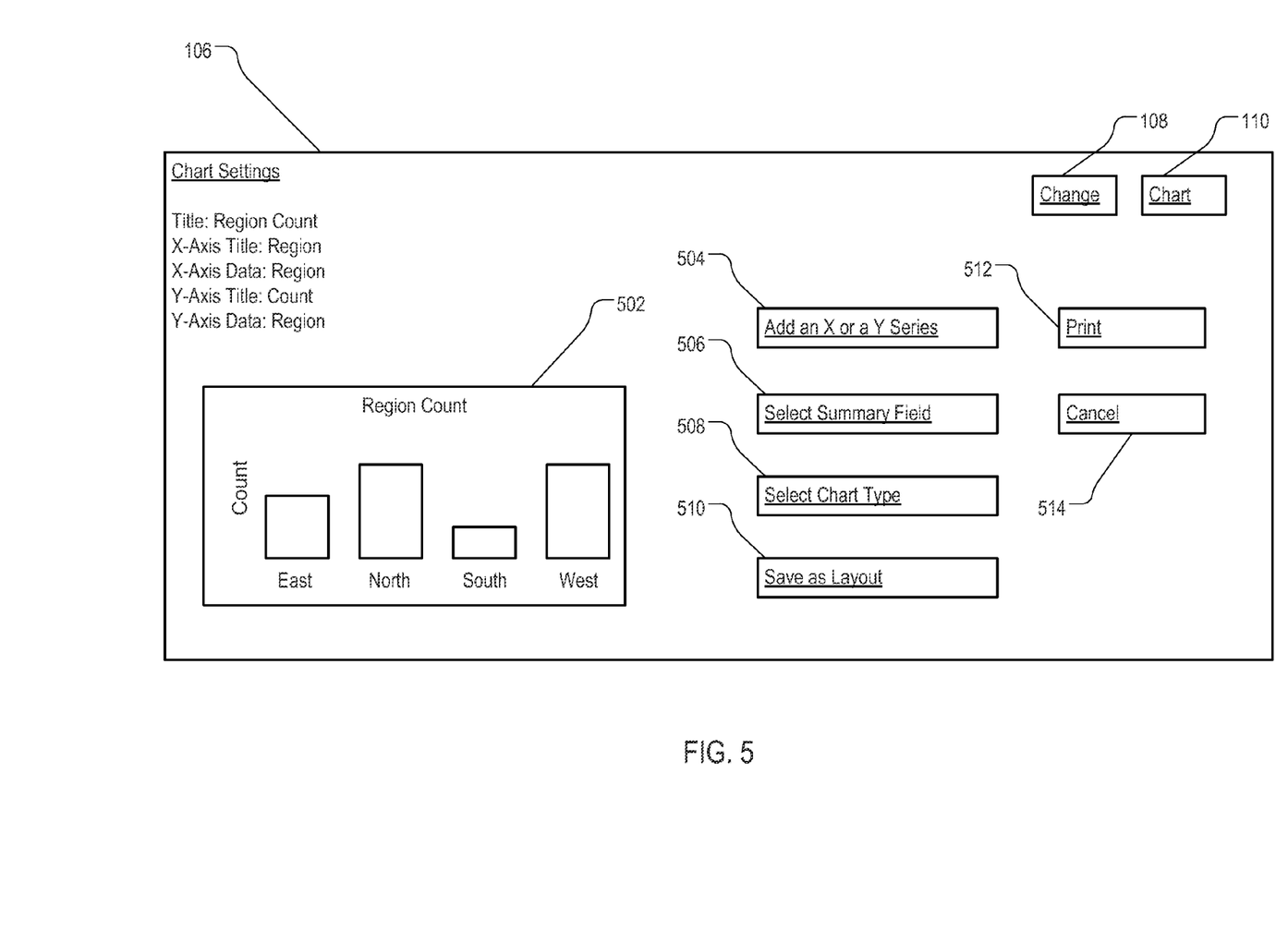
FIG. 5 is an exemplary chart setup dialog used in analytical charting.

FIG. 5 is exemplary chart setup dialog 106 used in analytical charting. Chart setup dialog 106 can be a user interface item populated using chart parameters determined in exemplary procedures 308A-C as described above. Chart setup dialog 106 can include preview chart 502 and one or more control items. Preview chart 502 can be a chart created based on system-determined parameters and a pre-specified chart type (e.g., a bar chart type). Specifically, preview chart 502 can be a chart the Y-data series of which is a first Y-data series, as described above.

The one or more control items of chart setup dialog 106 can include add series control 504. Add series control 504 can be a user interface item (e.g., a list box or a button) operable to receive an input (e.g., a click or touch). Upon receiving the input, add series control 504 can cause the system to add an additional data series to an X-axis or to a Y-axis.

The one or more control items of chart setup dialog 106 can include select summary control 506. Select summary control 506 can be a user interface item (e.g., a list box or a button) operable to receive an input (e.g., a click or touch). Upon receiving the input, select summary control 506 can cause the system to generate one or more summary fields of the data being charted. The one or more summary fields can include, for example, a total, an average, a count, a minimum, a maximum, a standard deviation, a standard deviation by population, or a fraction of total. If the system has determined, based on analysis of procedures 308A-C, that a summary operation is appropriate, the system can create a temporary summary field on the data. The temporary summary field can be rendered in preview chart 502.

Select summary control 506 can include multiple components. Select summary control 506 can include a data field element (e.g., a text box) that displays a name of a data field upon which a summary operation will be performed. Select summary control 506 can include a summary type element (e.g., a drop down menu) configured to display system-determined summary operation(s), e.g., a count, or an average. Select summary control 506 can allow a user to change the system-determined temporary summary field to another summary field (e.g., from "count" to "average").

Select summary control 506 can be provided based on a data type of the data being summarized. The system can provide select summary control 506 for display if a data field being summarized resolves to a number type or can be casted into a number type. In such cases, the system can provide a comprehensive list of summary operations as options. If the data field resolves to a text type, the system can provide "count" as a summary operation option and exclude other summary operations. If the data field resolves to another data type (e.g., container), the system can disable select summary control 506.

The one or more control items of chart setup dialog 106 can include chart type control 508. Chart type control 508 can be a user interface item (e.g., a list box or a button) operable to receive an input (e.g., a click or touch). Upon receiving the input, chart type control 508 can cause the system to change a chart type from a system-determined chart type (e.g., a bar chart) to a user-specified chart type (e.g., a pie chart).

The one or more control items of chart setup dialog 106 can include save chart control 510. Save chart control 510 can be a user interface item operable to receive an input. Upon receiving the input, save chart control 510 can cause the system to save the chart parameters including system-determined parameters or user-specified parameters to a layout. The system can generate a chart based on user inputs from a data view (e.g., a table view, form view, or list view). The layout can include an arrangement of fields, objects, pictures, and layout parts that represents the way information is organized and presented in the data view. Save chart control 510 can allow a user to change a layout underlying a data view without directly accessing the layout. For example, save chart control 510 can allow a user to change the layout without leaving a data view or entering a layout editor.

The one or more control items of chart setup dialog 106 can include print chart control 512 and cancel chart control 514. These controls are operable to receive user input to print a chart or cancel a chart, respectively. In some implementations, some or all control items can cause menus to be presented to a user in chart setup dialog 106. The system can populate the menu items using adapted data. For example, the system can apply one or more string truncating rules or string converting rules to a menu item when the menu item (e.g., a data series name) is longer than a threshold.

Exemplary Analytical Charting Processes

Figure 6:
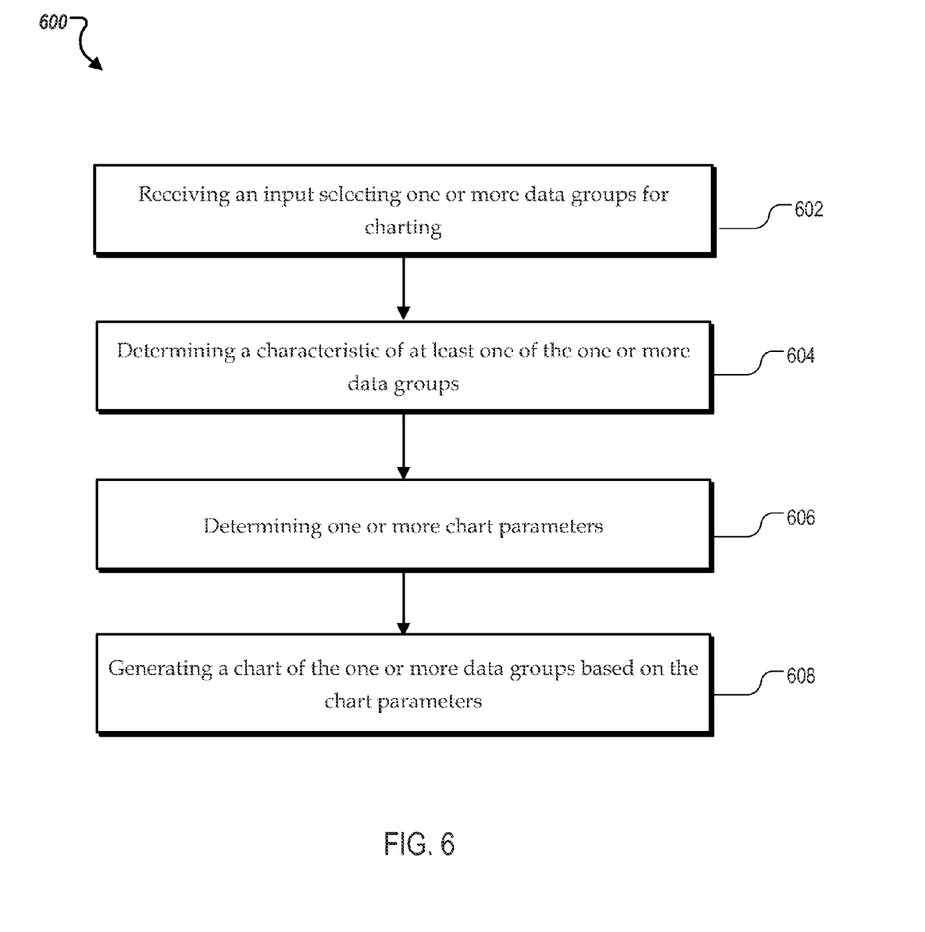
FIG. 6 is a flowchart of an exemplary process executed by a system implementing analytical charting techniques.

FIG. 6 is a flowchart of exemplary process 600 executed on a system implementing analytical charting techniques. The system can receive (602) an input selecting one or more data groups for charting. Each of the one or more data groups can correspond to a column of a database table or a data field of the database table. Receiving the input can receive receiving a user selection of one or more columns of data or one or more data fields displayed on a display device. The input can be a mouse input (e.g., a right click) or a touch input.

The system can determine (604) a characteristic of at least one of the one or more data groups. Determining the characteristic of the data group can include determining that the one or more selected columns are subject to one or more sort orders. Determining the characteristic of the data group can include determining that a data view displayed on the display device is subject to a sort order (e.g., sorted by a column of data not selected by a user for chart).

Determining the characteristic of the data group can including determining a data type of the data group, determining a data pattern of the data group, or both. Determining the data type of the data group can include determining that the data group has one of a summary type, a number type, or a text type. Determining the data pattern of the data group can include determining whether the data group contains repeating data. Determining whether the data group contains repeating data can include applying a dual-threshold sampling procedure to the data group. The system can extract data samples from the data group according to a sampling threshold. The system can determine the data group has a repeating data pattern when at least a threshold portion of the data samples has a same value.

The system can determine (606) one or more chart parameters for charting the one or more data groups based on the characteristic of the data group and the input. Determining the one or more chart parameters can include determining one or more menu items and language-specific grammatical constructions. Determining the one or more chart parameters can include presenting the one or more menu items and language-specific grammatical constructions in a user interface (e.g., chart setup dialog 106), such that a user selection of a menu item can cause the chart to be generated based at least in part on the user selection.

In some implementations, determining the one or more chart parameters can include determining a chart data grouping based on data type and a data repeating pattern of the data group. The chart data grouping can specify that a first data group be charted against a second data group. Determining the one or more chart parameters can include selecting, based on a context, one or more data series for the chart. The context can include an order in which the one or more data groups are selected. The context can include a data group among the one or more data groups, where the data group has a text data type.

In some implementations, determining the one or more chart parameters can include selecting, based on the context, the first data group as data series for a first chart axis, and selecting, based on the context, the second data group as data series for a second chart axis. For example, a data column having a text data type can be specified as a data series of the X-axis.

The system can generate (608) a chart of the one or more data groups based on the chart parameters. Generating the chart can include providing the chart for display on a display device, or providing the chart for printing on a printing device. In some implementations, the input selecting one or more data groups for charting is received in a data view. The data view can be generated based on the one or more data groups and a layout providing formatting information for the one or more data groups. Generating the chart can include generating the chart in the data view without specifying the one or more chart parameters in the layout. The system can receive an input requesting saving of the chart. In response, the system can save the one or more chart parameters as part of the layout. In some implementations, the system can generate the chart without receiving additional user input specifying parameters of the chart. In these implementations, the system can generate the chart using system-determined chart parameters.

Exemplary System Architecture

Figure 7:
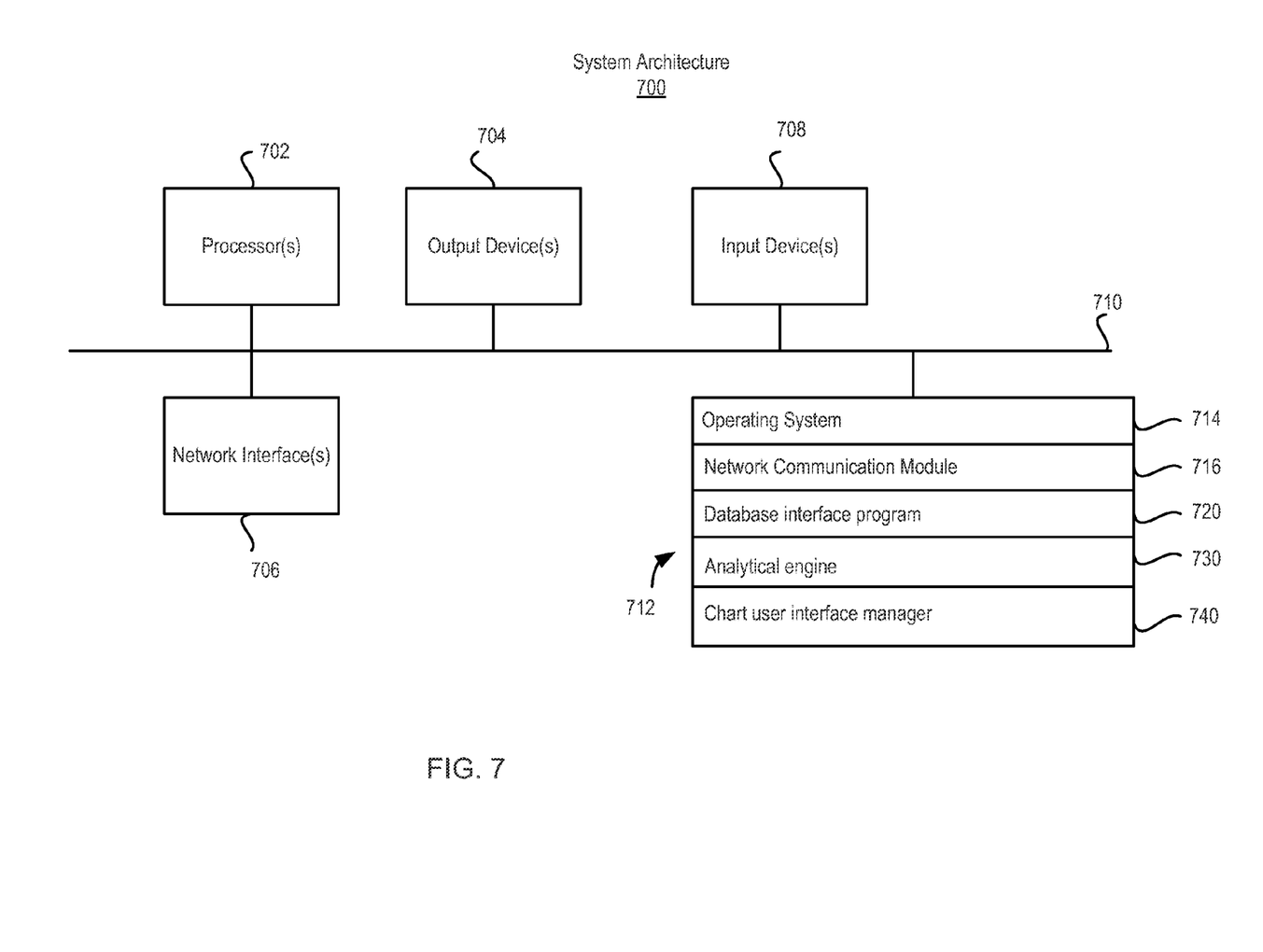
FIG. 7 is a block diagram of an exemplary system architecture for implementing the features and operations of FIGS. 1-6.

FIG. 7 is a block diagram of an exemplary system architecture 700 for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., a Linux® operating system), network communication module 716, database interface program 720, analytical engine 730, and chart user interface manager 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Database interface program 720 can include computer instructions that, when executed, cause processor 702 to perform operations of retrieving data from a database. Database interface program 720 can include interfaces to one or more databases on a file system. The databases can be organized under a hierarchical folder structure, the folders mapping to directories in the file system. Analytical engine 730 can include computer instructions that, when executed, cause processor 702 to perform analytical charting operations as described above in reference to FIGS. 3 and 4A-4C. User interface manager 740 can include computer instructions that, when executed, cause processor 702 to generate for display a data view and a user interface item (e.g., chart setup dialog 106 as described in reference to FIGS. 1 and 5).

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user, and a touch screen input device or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method for generating a chart, the method comprising:
   providing for display a data view of data, the data view comprising a plurality of data cells each displaying a data item, the plurality of data cells being organized into columns;
   receiving, by one or more processors, an input selecting a first data cell of the plurality of data cells, the first data cell being located in a first column, the first column being any column in the data view, the first data cell being any data cell in the first column;
   in response to the input, comparing the input with one or more specified criteria for determining whether the input is for generating the chart;
   based on determining that the input is for generating the chart, determining, by the one or more processors, a data type of the first data cell;
   upon determining that the data type is a non-numerical data type, determining, by the one or more processors, that a most likely chart type of the chart is a count of data items in the first column grouped by distinct data items in the first column;
   designating, by the one or more processors, the most likely chart type as one or more chart parameters for the chart, including designating a first axis of the chart for the distinct data items and designating a second axis of the chart for respective counts of data items grouped by the distinct data items; and
   generating the chart representing the respective counts.

2. The method of claim 1, wherein:
   each of the columns has a column name, and
   generating the chart comprises designating at least a portion of the column name as at least a portion of a name of the chart.

3. The method of claim 1, comprising:
   determining that a second data cell comprises a summary data field; and
   in response, excluding the second data cell from being represented in the chart, including representing only data items other than a data item in the second data cell on the first axis.

4. The method of claim 1, wherein determining that the data type is a non-numerical type includes determining that the data cell has one of a summary type or a text type.

5. The method of claim 3, wherein generating the chart comprises:
   providing for display the distinct data items along the first axis.

6. The method of claim 1, comprising:
   presenting one or more menu items in a user interface, wherein each menu item includes one or more options to change a data source of the first axis or the second axis.

7. The method of claim 1, wherein:
   the input selecting the first data cell is received in the data view, the data view being generated based on a layout providing formatting information for the plurality of data cells; and
   generating the chart comprises generating the chart in the data view without specifying the one or more chart parameters in the layout.

8. The method of claim 7, comprising:
   receiving an input requesting saving of the chart; and
   saving the one or more chart parameters as part of the layout.

9. The method of claim 1, wherein generating the chart occurs without receiving additional user input specifying parameters of the chart.

10. The method of claim 1, wherein comparing the input with one or more specified criteria comprises:
    determining whether the input is received at one or more of a pre-specified access point or in a pre-specified input zone of the display.

11. The method of claim 1, wherein comparing the input with one or more specified criteria comprises:
    determining whether a user action associated with the input is one of specified user action types.

12. A non-transitory storage medium storing instructions operable to cause one or more processors to perform operations comprising:
    providing for display a data view of data, the data view comprising a plurality of data cells each displaying a data item, the plurality of data cells being organized into columns;
    receiving an input selecting a first data cell of the plurality of data cells, the first data cell being located in a first column, the first column being any column in the data view, the first data cell being any data cell in the first column;
    in response to the input, comparing the input with one or more specified criteria for determining whether the input is for generating a chart;
    based on determining that the input is for generating the chart, determining a data type of the first data cell;
    upon determining that the data type is a non-numerical data type, determining that a most likely chart type of the chart is a count of data items in the first column grouped by distinct data items in the first column;
    designating the most likely chart type as one or more chart parameters for the chart, including designating a first axis of the chart for the distinct data items and designating a second axis of the chart for respective counts of data items grouped by the distinct data items; and
    generating the chart representing the respective counts.

13. The non-transitory storage medium of claim 12, wherein:
each of the columns has a column name, and
generating the chart comprises designating at least a portion of the column name as at least a portion of a name of the chart.

14. The non-transitory storage medium of claim 12, wherein the operations comprise:
determining that a second data cell comprises a summary data field; and
in response, excluding the second data cell from being represented in the chart, including representing only data items other than a data item in the second data cell on the first axis.

15. The non-transitory storage medium of claim 14, wherein determining that the data type is a non-numerical type includes determining that the data cell has one of a summary type or a text type.

16. The non-transitory storage medium of claim 14, wherein generating the chart comprises:
providing for display the distinct data items along the first axis.

17. The non-transitory storage medium of claim 12, the operations comprising:
presenting one or more menu items in a user interface, wherein each menu item includes one or more options to change a data source of the first axis or the second axis.

18. The non-transitory storage medium of claim 12, wherein comparing the input with one or more specified criteria comprises:
determining whether the input is received at one or more of a pre-specified access point or in a pre-specified input zone of the display.

19. The non-transitory storage medium of claim 12, wherein comparing the input with one or more specified criteria comprises:
determining whether a user action associated with the input is one of specified user action types.

20. A system comprising:
one or more processors;
a non-transitory storage medium storing instructions operable to cause the one or more processors to perform operations comprising:
providing for display a data view of data, the data view comprising a plurality of data cells each displaying a data item, the plurality of data cells being organized into columns;
receiving an input selecting a first data cell of the plurality of data cells, the first data cell being located in a first column, the first column being any column in the data view, the first data cell being any data cell in the first column;
in response to the input, comparing the input with one or more specified criteria for determining whether the input is for generating a chart;
based on determining that the input is for generating the chart, determining a data type of the first data cell;
upon determining that the data type is a non-numerical data type, determining that a most likely chart type of the chart is a count of data items in the first column grouped by distinct data items in the first column;
designating the most likely chart type as one or more chart parameters for the chart, including designating a first axis of the chart for the distinct data items and designating a second axis of the chart for respective counts of data items grouped by the distinct data items; and
generating the chart representing the respective counts.

21. The system of claim 20, wherein:
each of the columns has a column name, and
generating the chart comprises designating at least a portion of the column name as at least a portion of a name of the chart.

22. The system of claim 20, wherein the operations comprise:
determining that a second data cell comprises a summary data field; and
in response, excluding the second data cell from being represented in the chart, including representing only data items other than a data item in the second data cell on the first axis.

23. The system of claim 22, wherein determining that the data type is a non-numerical type includes determining that the data cell has one of a summary type or a text type.

24. The system of claim 22, wherein generating the chart comprises:
providing for display the distinct data items along the first axis.

25. The system of claim 20, wherein the operations comprise:
presenting one or more menu items in a user interface, wherein each menu item includes one or more options to change a data source of the first axis or the second axis.

26. The system of claim 20, wherein:
the input selecting the first data cell is received in the data view, the data view being generated based on a layout providing formatting information for the plurality of data cells; and
generating the chart comprises generating the chart in the data view without specifying the one or more chart parameters in the layout.

27. The system of claim 26, comprising:
receiving an input requesting saving of the chart; and
saving the one or more chart parameters as part of the layout.

28. The system of claim 26, wherein generating the chart occurs without receiving additional user input specifying parameters of the chart.

29. The system of claim 20, wherein comparing the input with one or more specified criteria comprises:
determining whether the input is received at one or more of a pre-specified access point or in a pre-specified input zone of the display.

30. The system of claim 20, wherein comparing the input with one or more specified criteria comprises:
determining whether a user action associated with the input is one of specified user action types.

* * * * *